United States Patent [19]

Miyazono et al.

[11] Patent Number: 5,762,733
[45] Date of Patent: Jun. 9, 1998

[54] PNEUMATIC RADIAL TIRES INCLUDING A TIRE COMPONENT CONTAINING GROUPS OF REINFORCING ELEMENTS

[75] Inventors: Toshiya Miyazono; Yoshihide Kohno; Hiroyuki Koseki; Yoichi Okamoto, all of Tokyo, Japan

[73] Assignee: Bridgestone Corporation, Tokyo, Japan

[21] Appl. No.: 775,136

[22] Filed: Dec. 31, 1996

Related U.S. Application Data

[62] Division of Ser. No. 341,038, Nov. 15, 1994, which is a continuation of Ser. No. 13,802, Feb. 4, 1993, abandoned, which is a continuation-in-part of Ser. No. 742,807, Aug. 9, 1991, abandoned.

[30] Foreign Application Priority Data

| Aug. 10, 1990 | [JP] | Japan | 2-210201 |
| Feb. 4, 1992 | [JP] | Japan | 4-18985 |
| Feb. 5, 1992 | [JP] | Japan | 4-20099 |
| Feb. 5, 1992 | [JP] | Japan | 4-20100 |

[51] Int. Cl.$^6$ .................. B06C 15/00; B06C 15/06; B06C 9/00
[52] U.S. Cl. .................. 152/543; 152/451; 428/295.4
[58] Field of Search .................. 152/451, 526, 152/527, 530, 531, 536, 548, 563, 555–560, 539, 542, 543; 139/425 R; 428/295.4, 296.1

[56] References Cited

U.S. PATENT DOCUMENTS

| 677,290 | 6/1901 | Tillinghast | 152/556 |
| 688,319 | 12/1901 | Litchfield et al. | 152/563 X |
| 1,560,700 | 11/1925 | Langer | 152/563 |
| 1,608,102 | 11/1926 | Jury | 152/451 X |
| 1,624,615 | 4/1927 | Midgley | 152/559 |
| 2,958,359 | 11/1960 | Bossu et al. | 152/531 |
| 2,982,328 | 5/1961 | Emanueli et al. | 152/527 |
| 3,003,537 | 10/1961 | Engstrom et al. | 152/543 |
| 3,093,181 | 6/1963 | Beckadolph | 152/531 X |
| 3,224,482 | 12/1965 | Barassi et al. | 152/526 X |
| 3,298,417 | 1/1967 | Keefe, Jr. | 152/527 X |
| 3,503,432 | 3/1970 | Maiocchi | 152/531 X |
| 3,782,438 | 1/1974 | Mirtain | 152/209 R |
| 3,957,091 | 5/1976 | Buyssens et al. | 139/425 R |
| 4,363,346 | 12/1982 | Pepe | 152/536 X |
| 4,742,858 | 5/1988 | Takahira | 152/536 |
| 4,840,214 | 6/1989 | Bourgois | 152/527 |
| 4,938,015 | 7/1990 | Kinoshita | 152/527 X |
| 5,061,557 | 10/1991 | Kot et al. | 152/527 X |
| 5,188,685 | 2/1993 | Cherveny et al. | 152/527 X |
| 5,198,307 | 3/1993 | Bourgois et al. | 152/527 X |
| 5,234,044 | 8/1993 | Bourgois | 152/527 |

FOREIGN PATENT DOCUMENTS

| 0414470 | 2/1991 | European Pat. Off. . | |
| 0 470 835 | 2/1992 | European Pat. Off. | 152/526 |
| 1145849 | 7/1960 | France . | |
| 1328156 | 7/1962 | France . | |
| 2312383 | 12/1976 | France . | |
| 2398625 | 2/1979 | France . | |
| U-58-113504 | 8/1983 | Japan . | |
| A-62-149929 | 7/1987 | Japan . | |
| U-62-120004 | 7/1987 | Japan . | |
| A-63-240402 | 10/1988 | Japan . | |
| 64-24603 | 2/1989 | Japan . | |
| 2015937 | 9/1979 | United Kingdom . | |

*Primary Examiner*—Adrienne C. Johnstone
*Attorney, Agent, or Firm*—Sughrue, Mion, Zinn, Macpeak & Seas, PLLC

[57] ABSTRACT

A tire component used in a pneumatic radial tire is a rubber-coated layer comprised of a given number of reinforcing elements separately arranged in parallel with each other, in which the reinforcing elements corresponding to at least 30% of all reinforcing elements included in the rubber-coated layer are divided into plural groups, and a distance between mutually adjoining and opposite reinforcing elements not grouped with each other is wider than a distance between mutually adjoining reinforcing elements separately arranged at equal spaces in the group. Thus, the occurrence of cracking at cut ends of the reinforcing elements is prevented to improve the tire durability.

42 Claims, 20 Drawing Sheets

FIG. 2a COMPARATIVE

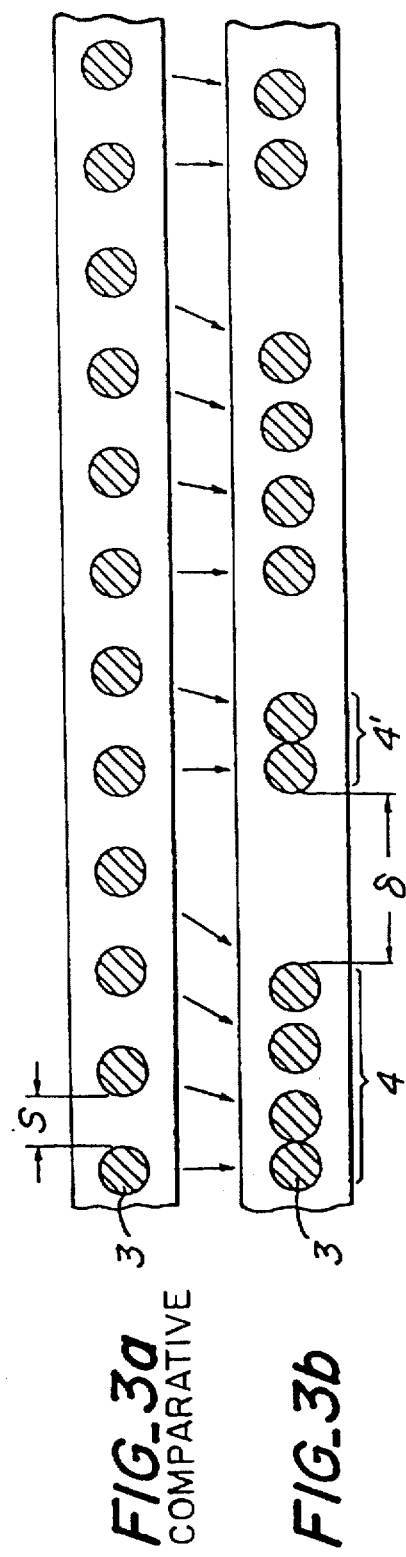
FIG_3a COMPARATIVE
FIG_3b

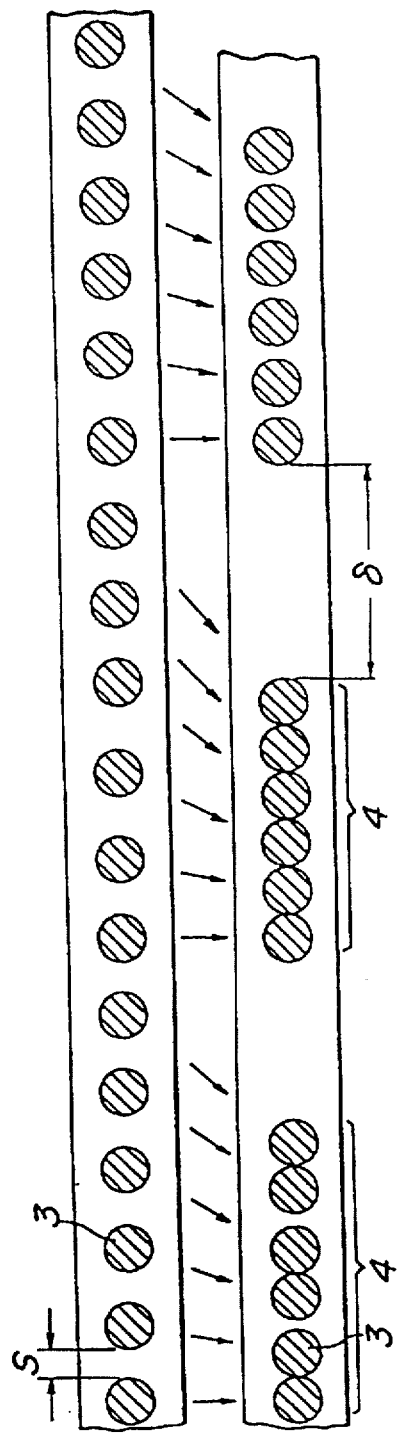

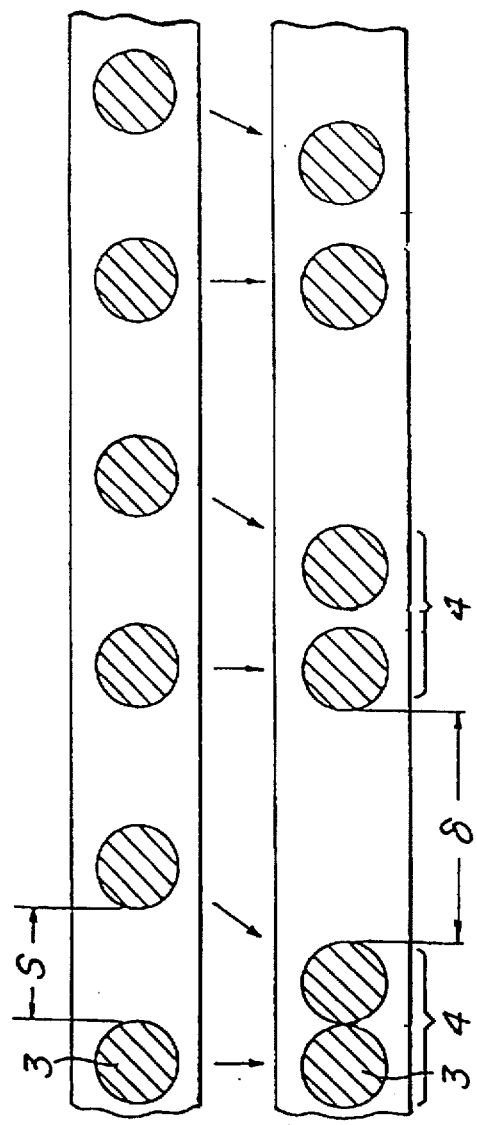

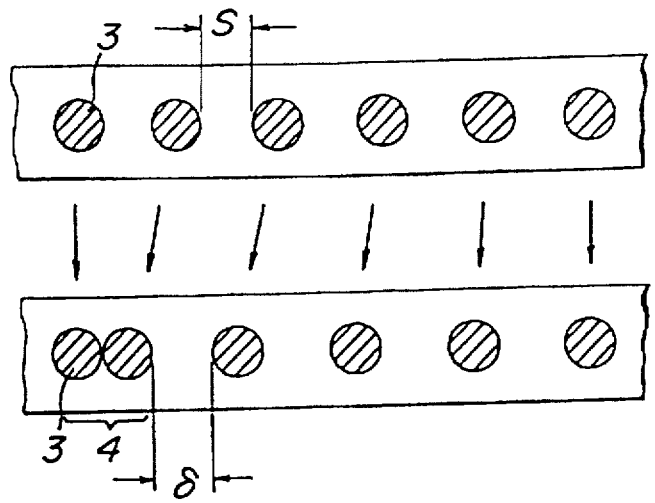
FIG_6a COMPARATIVE
FIG_6b
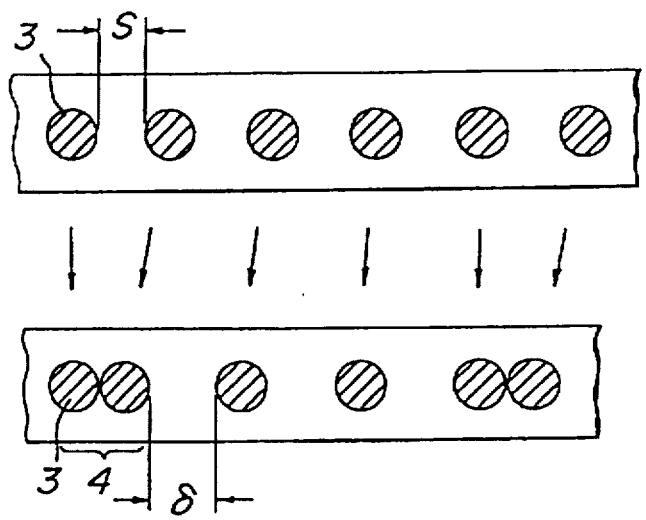
FIG_7a COMPARATIVE
FIG_7b

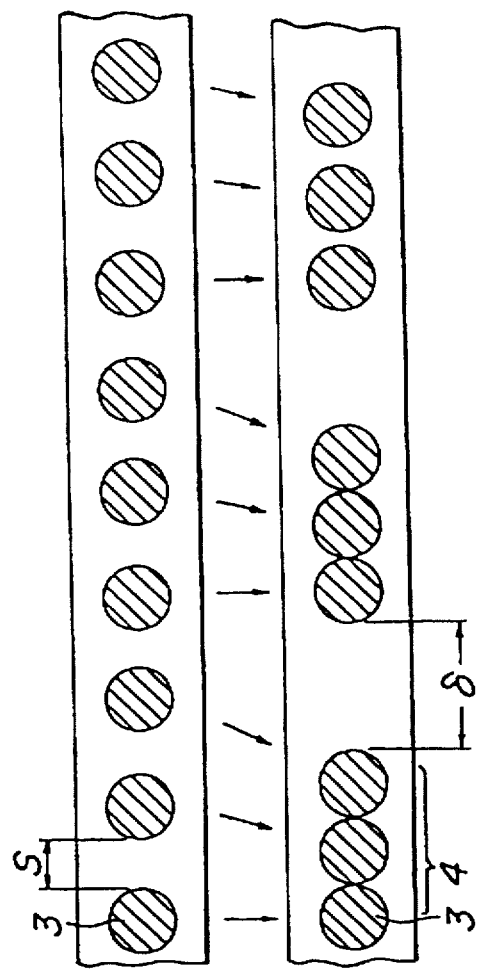

FIG_10
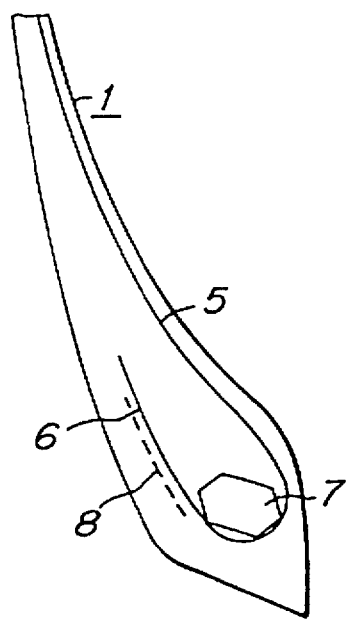
FIG_11a
COMPARATIVE
FIG_11b
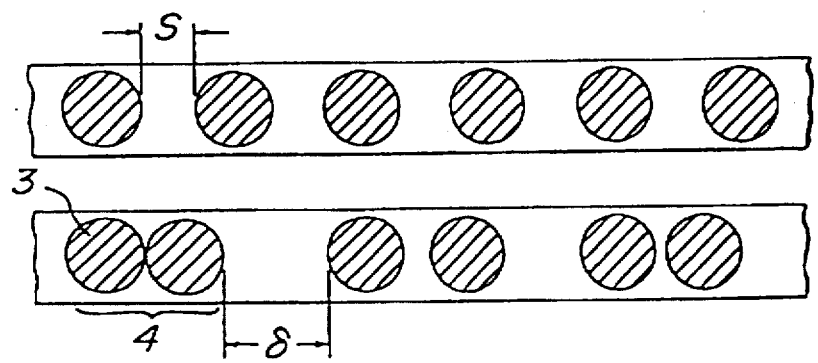

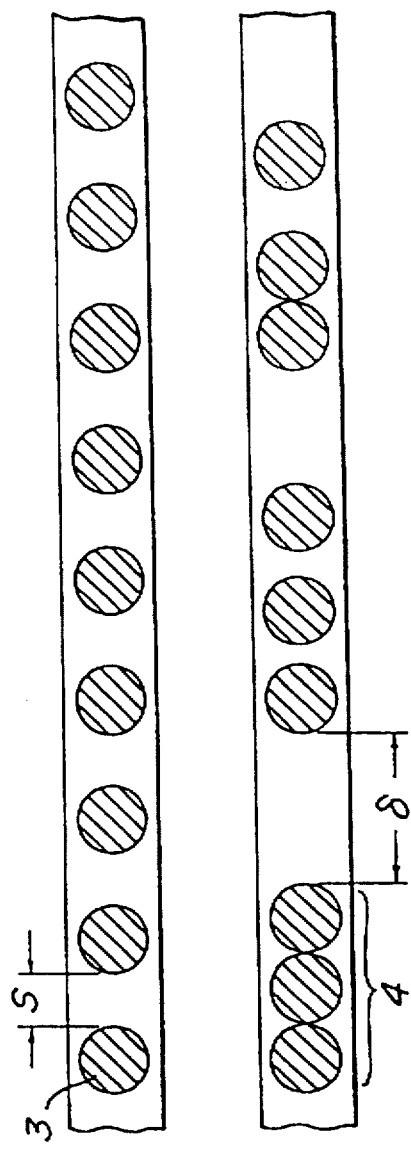

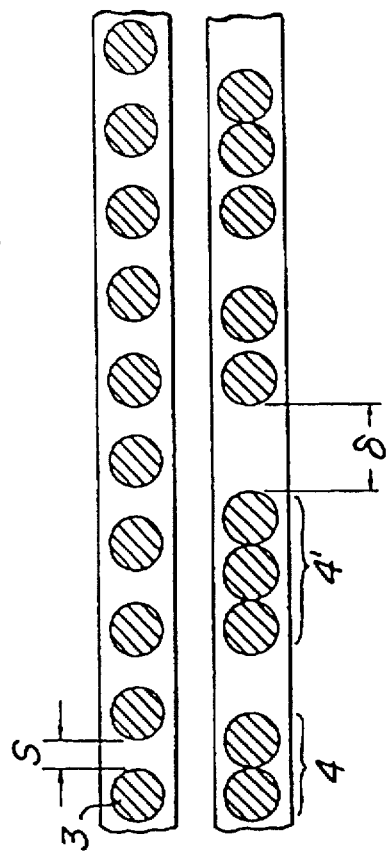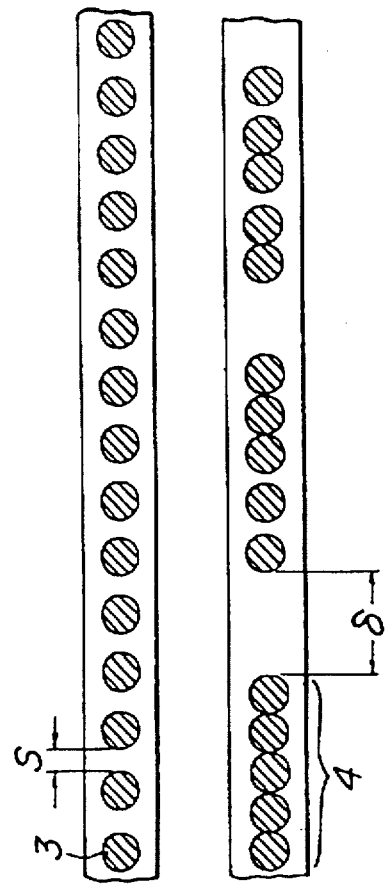
FIG._13a COMPARATIVE
FIG._13b
FIG._14a COMPARATIVE
FIG._14b

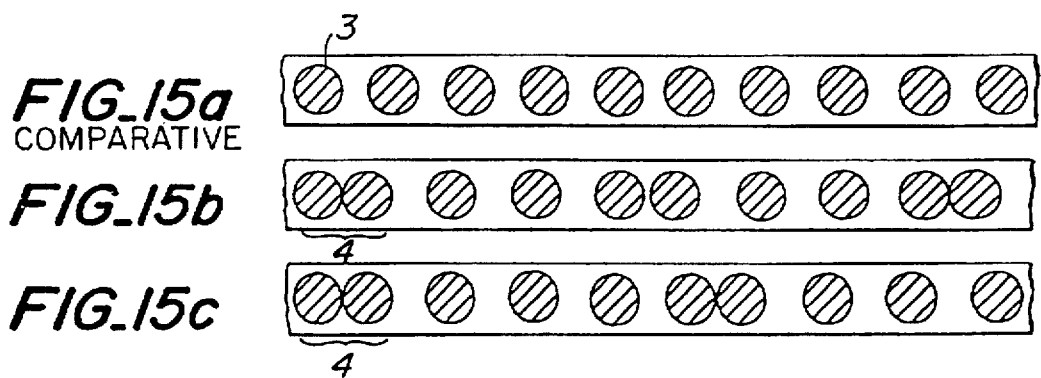
FIG_15a COMPARATIVE
FIG_15b
FIG_15c
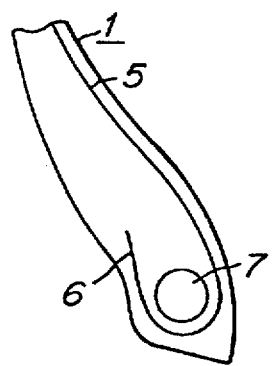
FIG_16

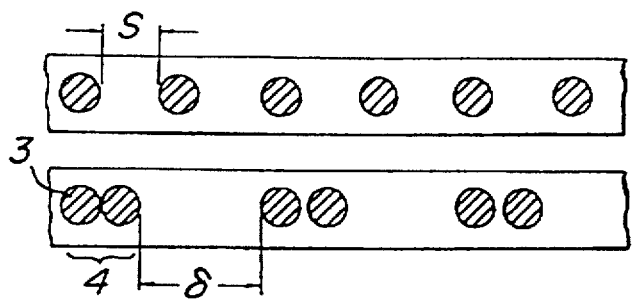
FIG_17a COMPARATIVE
FIG_17b
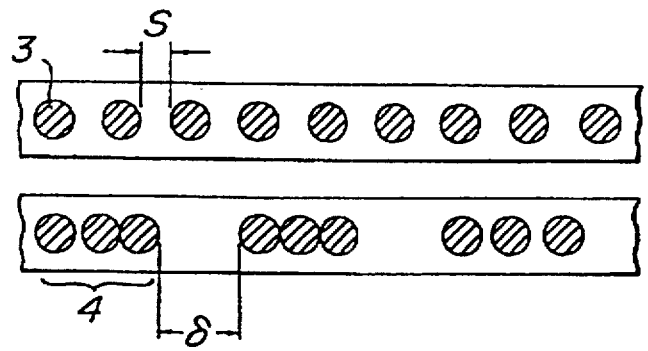
FIG_18a COMPARATIVE
FIG_18b

FIG_19
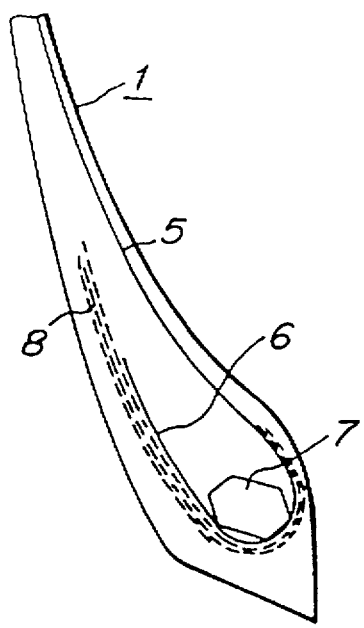
FIG_20
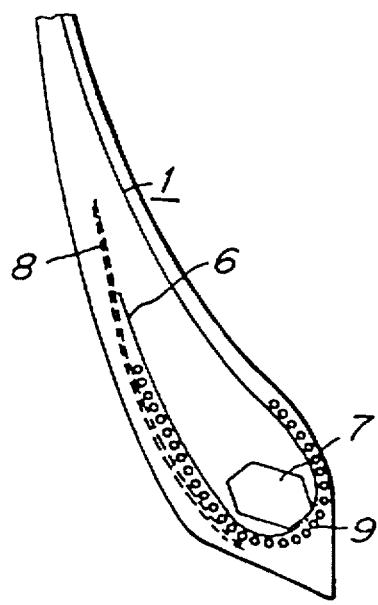

FIG. 21a COMPARATIVE

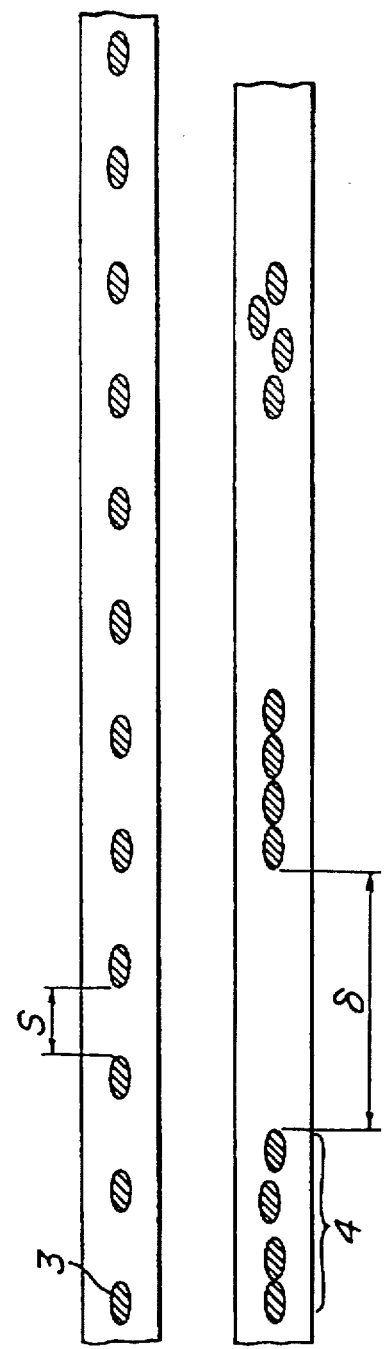

FIG. 23a COMPARATIVE

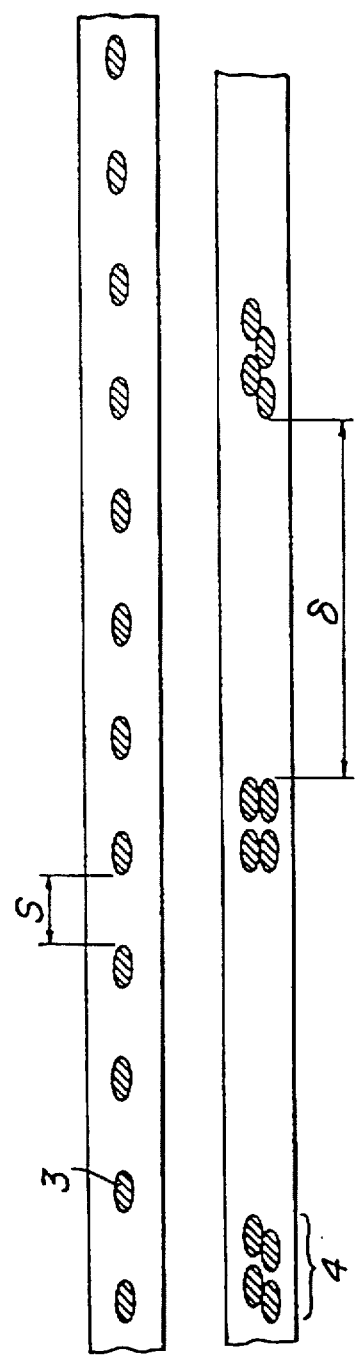

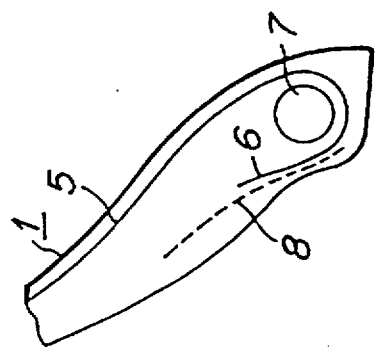
FIG._25
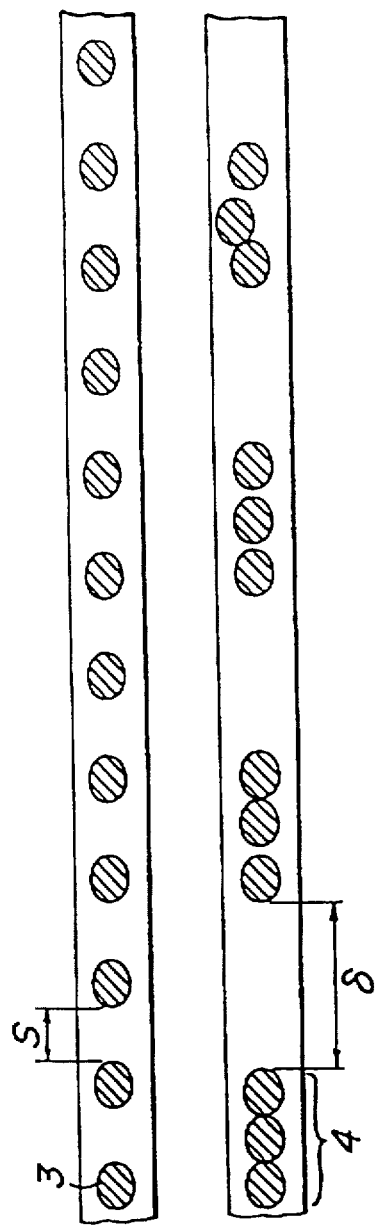
FIG._26a COMPARATIVE
FIG._26b

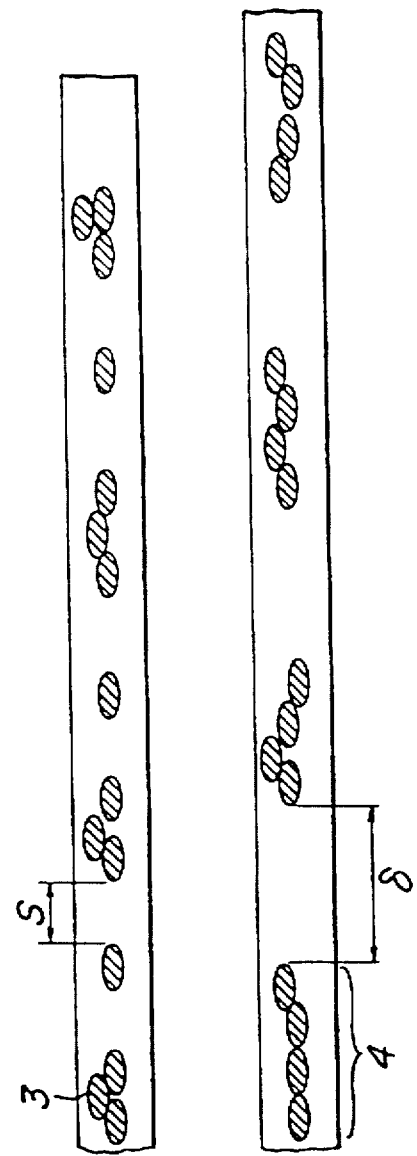

PNEUMATIC RADIAL TIRES INCLUDING A TIRE COMPONENT CONTAINING GROUPS OF REINFORCING ELEMENTS

This is a divisional of application Ser. No. 08/341,038 filed Nov. 15, 1994, which is a continuation of 08/013,802 filed Feb. 4, 1993, now abandoned, which is a continuation-in-part of 07/742,807 filed Aug. 9, 1991, now abandoned.

BACKGROUND OF THE INVENTION

1. Field of The Invention

This invention relates to pneumatic tires, and more particularly to a pneumatic radial tire having improved durability by improving components for tire skeleton and its reinforcement such as a belt serving to reinforce a tread portion, a turnup portion of a carcass ply and a bead portion reinforcing layer serving to reinforce a bead portion and the like.

2. Description of the Related Art

As is well-known, the belt of a tire serves to reinforce the tread portion and particularly acts to enhance the rigidity in the circumferential direction of the tire in case of a pneumatic radial tire. Furthermore, the carcass ply constitutes a skeleton of the tire and its turnup portion contributes to reinforce the bead portion. Moreover, the bead portion reinforcing layer prevents the bead portion from collapsing toward a rim flange brought about by contacting with ground for reinforcing the bead portion and is usually arranged so as to extend from a neighborhood of a bead core or from inside of the tire around the bead core toward outside thereof in the radial direction of the tire along the turnup portion of the carcass ply at a position exceeding the turnup end.

In such tires, it is usual that a rubberized layer formed by embedding reinforcing elements such as monofilaments or cords of organic material or steel in rubber at equal spaces is used as the belt, carcass ply or bead portion reinforcing layer. These reinforcing elements are arranged at a certain inclination angle with respect to an equator of the tire in case of the belt, at a certain inclination angle or right angle with respect to the equator in case of the carcass ply, and a certain inclination angle with respect to the reinforcing element of the carcass ply in case of the bead portion reinforcing layer.

Among the conventional tire components containing the reinforcing elements arranged parallel at equal spaces, when the component is used in the belt, rubber that faces the cut ends of the reinforcing elements is pierced by these reinforcing elements at the widthwise end of the belt due to the tire deformation during the contact with ground to create fine cracking. Such cracking gradually grows between the adjoining reinforcing elements and then rapidly propagates between the mutually laminated belt layers constituting the belt to finally cause a so-called belt separation failure. The propagation rate of the cracking until the occurrence of belt separation failure is fast, which is a major factor for determining the durability of the radial tire.

Furthermore, when the tire component is used in the carcass ply, rubber facing to cut ends of the reinforcing elements is pierced by these reinforcing elements at the turnup end of the carcass ply due to the tire deformation during the contact with ground to create fine cracking. Such cracking gradually grows between the adjoining reinforcing elements and then rapidly propagates toward a sidewall portion and a stiffener, which is a factor for determining the durability of the bead portion.

Similarly, when the tire component is used in the bead portion reinforcing layer, rubber facing to cut ends of the reinforcing elements is pierced by these reinforcing elements at the axially outward or inward end of the bead portion reinforcing layer due to the tire deformation during the contact with ground to create fine cracking. Such cracking gradually grows between the adjoining bead portion reinforcing layers and then rapidly propagates toward the carcass ply or the outside of the tire, which is also a factor for determining the durability of the bead portion in the tire.

Therefore, it is important to control the growth of the cracking. For this purpose, it is advantageous to widen a distance between the mutually adjacent reinforcing elements. However, it is desired to make small the diameter of the reinforcing element because the reduction of tire weight is strongly demanded and also the simplification of the cord used as the reinforcing element is required. As a result, in order to hold the same level of tire strength by using the reinforcing element of smaller diameter, it is thus necessary to increase the end count of the reinforcing elements embedded in rubber and hence the distance between the adjacent reinforcing elements is rather narrower, which undermines the objective of controlling cracking growth.

SUMMARY OF THE INVENTION

It is, therefore, an object of the invention to effectively and adequately solve the problem of degrading the durability of the tire due to the subsequent growth and propagation of fine cracking created at rubber facing to the cut ends of the reinforcing elements at the widthwise end of the conventional tire component and to provide a pneumatic radial tire comprising improved tire components applicable for the solution of this problem.

According to the invention, there is the provision of a pneumatic radial tire comprising various tire components each having a certain circumferential length and comprised of a rubber-coated layer containing a given number of reinforcing elements separately arranged in parallel with each other therein, characterized in that the reinforcing elements corresponding to at least 30% of all reinforcing elements included in said rubber-coated layer are divided into plural groups each consisting of 2–9 reinforcing elements, and a distance between mutually adjacent and opposite reinforcing elements, which are not grouped with each other, is wider than a distance between mutually adjacent reinforcing elements in the group.

In the tire according to the invention, the tire component includes a belt serving to reinforce a tread portion, at least one carcass ply wound around each of a pair of bead cores from an inside of the tire toward an outside thereof and at least one bead portion reinforcing layer folded about each bead core from the inside of the tire toward the outside thereof and extending along the turnup portion of the carcass ply upward in the radial direction of the tire as well as a belt reinforcing layer covering a part or a full width of the belt and the like.

As a material of the reinforcing element, use may be made of any organic monofilaments, organic fiber cords, steel monofilaments and steel cords usually used in the manufacture of the radial tire. As the organic monofilament or fiber cord, there are nylon monofilament or fiber cord, high-modulus polyethylene terephthalate monofilament or fiber cord, aromatic polyamide (a trade name or Kevlar) monofilament or fiber cord and the like. Moreover, there may be used a combination of the reinforcing elements having different diameters, a combination of the reinforcing elements having different materials, a combination of the reinforcing elements having different materials and diameters and the like.

Furthermore, the number of the reinforcing elements per group can vary or be the same for each group. Moreover, a distance between the adjacent reinforcing elements in the group is narrower than the distance between the adjacent reinforcing elements not in the group. In addition, the reinforcing elements in the group may be arranged in parallel with each other but shifted with each other in the radial direction. And also, at least some of the reinforcing elements in the group may be overlapped with each other.

When all of the reinforcing elements in the rubber-coated layer are divided into plural same groups containing a given number of the reinforcing elements, if few reinforcing elements are left over these groups in accordance with the total reinforcing element number required for the formation of tire skeleton or its reinforcement, these remaining reinforcing elements may be arranged substantially at a space equal to the distance between the mutually adjacent and opposite reinforcing elements not grouped with each other.

BRIEF DESCRIPTION OF THE DRAWINGS

The invention will be described with reference to the accompanying drawings, wherein:

FIGS. 2a and 2b are schematic views partly shown in section of a first embodiment of the rubber-coated layer showing a comparative arrangement of reinforcing elements, respectively;

FIGS. 3a and 3b are schematic views partly shown in section of a second embodiment of the rubber-coated layer showing a comparative arrangement of reinforcing elements, respectively;

FIGS. 4a and 4b are schematic views partly shown in section of a third embodiment of the rubber-coated layer showing a comparative arrangement of reinforcing elements, respectively;

FIGS. 5a and 5b are schematic views partly shown in section of a fourth embodiment of the rubber-coated layer showing a comparative arrangement of reinforcing elements, respectively;

FIGS. 6a and 6b are schematic views partly shown in section of a fifth embodiment of the rubber-coated layer showing a comparative arrangement of reinforcing elements, respectively;

FIGS. 7a and 7b are schematic views partly shown in section of a sixth embodiment of the rubber-coated layer showing a comparative arrangement of reinforcing elements, respectively;

FIGS. 9a and 9b are schematic views partly shown in section of a seventh embodiment of the rubber-coated layer showing a comparative arrangement of reinforcing elements, respectively;

FIG. 10 is a diagrammatically section view of a second embodiment of the pneumatic tire for truck and bus to be tested;

FIGS. 11a and 11b are schematic views partly shown in section of an eighth embodiment of the rubber-coated layer showing a comparative arrangement of reinforcing elements, respectively;

FIGS. 12a and 12b are schematic views partly shown in section of a ninth embodiment of the rubber-coated layer showing a comparative arrangement of reinforcing elements, respectively;

FIGS. 13a and 13b are schematic views partly shown in section of a tenth embodiment of the rubber-coated layer showing a comparative arrangement of reinforcing elements, respectively;

FIGS. 14a and 14b are schematic views partly shown in section of an eleventh embodiment of the rubber-coated layer showing a comparative arrangement of reinforcing elements, respectively;

FIGS. 15a, 15b and 15c are schematic views partly shown in section of a twelfth embodiment of the rubber-coated layer showing a comparative arrangement of reinforcing elements, respectively;

FIG. 16 is a diagrammatically section view of a second embodiment of the pneumatic tire for passenger car to be tested;

FIGS. 17a and 17b are schematic views partly shown in section of a thirteenth embodiment of the rubber-coated layer showing a comparative arrangement of reinforcing elements, respectively;

FIGS. 18a and 18b are schematic views partly shown in section of a fourteenth embodiment of the rubber-coated layer showing a comparative arrangement of reinforcing elements, respectively;

FIG. 19 is a diagrammatically section view of a third embodiment of the pneumatic tire for truck and bus to be tested;

FIG. 20 is a diagrammatically section view of a fourth embodiment of the pneumatic tire for truck and bus to be tested;

FIGS. 21a and 21b are schematic views partly shown in section of a fifteenth embodiment of the rubber-coated layer showing a comparative arrangement of reinforcing elements, respectively;

FIGS. 22a and 22b are schematic views partly shown in section of a sixteenth embodiment of the rubber-coated layer showing a comparative arrangement of reinforcing elements, respectively;

FIGS. 23a and 23b are schematic views partly shown in section of a seventeenth embodiment of the rubber-coated layer showing a comparative arrangement of reinforcing elements, respectively;

FIGS. 24a and 24b are schematic views partly shown in section of an eighteenth embodiment of the rubber-coated layer showing a comparative arrangement of reinforcing elements, respectively;

FIG. 25 is a diagrammatically section view of a third embodiment of the pneumatic tire for passenger car to be tested;

FIGS. 26a and 26b are schematic views partly shown in section of a nineteenth embodiment of the rubber-coated layer showing a comparative arrangement of reinforcing elements, respectively; and FIGS. 27a and 27b are schematic views partly shown in section of the other embodiments of the rubber-coated layer showing an arrangement of reinforcing elements according to the invention, respectively.

DESCRIPTION OF THE PREFERRED EMBODIMENTS

Figure 1:
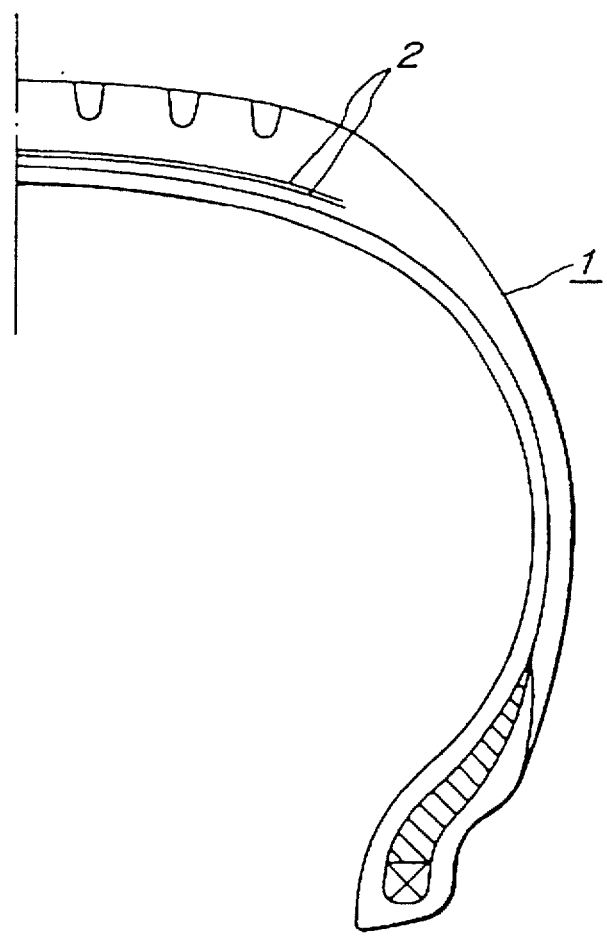
FIG. 1 is a diagrammatically section view of a first embodiment of the pneumatic tire for passenger car to be tested.

In order to provide the rubber-coated layer comprised of the reinforcing elements for use in the tire component, according to the invention, a calendered ply containing the reinforcing elements is first formed, for example, by using a combination of comb-type roll and calender rolls. In this case, the reinforcing elements are divided into plural groups each containing several reinforcing elements such as groups of two reinforcing elements by means of the comb-type roll and then coated with a rubber sheet by means of calender rolls to form a calendered ply.

If it is intended to use the calendered ply as a tire component for the reinforcement of the tire so as to incline the reinforcing elements at a certain angle with respect to the equator of the tire, the calendered ply is slantly cut in the widthwise direction of the calendered ply and then the cut plies are rejoined at their widthwise ends with each other to form a continuous rubber strip, which is wound into a coil and then supplied to a tire building step.

As previously mentioned, the rubber breakage at cut ends of the reinforcing elements in the tire component is based on the fine cracking created by repeatedly piercing the reinforcing elements into rubber facing the the cut ends of the reinforcing elements every the tire deformation and grown along the surface of the reinforcing element. Apart from such an initial stage, when the reinforcing elements are separately arranged in parallel with each other at equal spaces according to the conventional technique, the cracking immediately starts to grow across the mutually adjoining reinforcing elements and rapidly propagates between laminated rubber-coated layers as the tire component or toward the inside or outside of the tire about the tire component to cause various separation failures, crackings and the like.

On the contrary, according to the invention, the reinforcing elements corresponding to at least 30% of all reinforcing elements included in the rubber-coated layer are divided into plural groups containing 2–9 reinforcing elements, so that the groups and the reinforcing elements not belonging to the group are incorporated in the rubber-coated layer. Therefore, the distance between the mutually adjacent and opposite reinforcing elements not grouped with each other becomes wider than the distance between the adjacent reinforcing elements when they are arranged at equal spaces in the group. As a result, the growth of the cracking after the initial cracking stage between the adjacent reinforcing elements is delayed in accordance with the distance between the mutually adjacent and opposite reinforcing elements, whereby the rapid propagation to separation and cracking failures is effectively controlled.

As the rigidity of the reinforcing element becomes high, the occurrence of initial cracking by the piercing of the reinforcing element at the side end of the tire component is naturally faster than that in the reinforcing element such as nylon fiber cord or polyethylene terephthalate fiber cord. Therefore, when the invention is applied to the high rigidity reinforcing elements such as Kevlar fiber cord, steel cord and the like, the effect of controlling the rapid propagation to separation failure becomes more conspicuous.

Moreover, even when only the reinforcing elements corresponding to less than 30% of all reinforcing elements included in the rubber-coated layer are divided into groups each comprised of some reinforcing elements, the distance between the mutually adjacent and opposite reinforcing elements becomes somewhat wider than the distance between the adjacent reinforcing elements in the group, so that the occurrence of separation and cracking failures can be prevented, but it can not be said that the control effect is too high. Such an effect is conspicuous when the reinforcing elements corresponding to at least 50% of all reinforcing elements included in the rubber-coated layer are divided into plural groups.

When the number of the reinforcing elements in the group is more than 9, the distance between the mutually adjoining and opposite reinforcing elements not grouped with each other can be more widened, but unadhered portion of the cut ends of the reinforcing elements in the group becomes gradually larger to undesirably cause the propagation of the cracking inside the group. Preferably, the number of the reinforcing elements in the group is 2–6.

The following examples are given in illustration of the invention and are not intended as limitations thereof.

EXAMPLE 1

Radial tires 1 for passenger car having a tire size of 185/70 R14 as sectionally shown in FIG. 1 are tested, in which two belt layers 2 are arranged as a belt for reinforcing a tread portion of the tire 1 and the other tire structure is the same as in the conventional radial tire. As each of the belt layers 2 are used the conventional rubber-coated layer and the rubber-coated layer according to the invention having various arrangements of reinforcing elements 3 as shown in FIGS. 2a to 7b and 21a and 21b, respectively. Numeral 4 is a group comprised of given number of the reinforcing elements 3.

In the belt layer 2 shown in FIGS. 2a, 3a, 4a, 5a, 6a 7a and 21a, the reinforcing elements 3 are separately arranged at equal spaces S in the rubber-coated layer according to the conventional technique. In the belt layer 2 shown in FIGS. 2b, 3b, 4b, 5b, 6b 7b and 21b, the reinforcing elements 3 are divided into groups 4 each comprised of some reinforcing elements, which are arranged at a distance δ between mutually adjacent and opposite reinforcing elements not grouped with each other wider than the space S. FIG. 3b shows an embodiment of alternately arranging two kinds of groups 4, 4' containing different reinforcing element numbers. Moreover, there are used various reinforcing elements 3 as shown in Table 1.

In all of the test tires, the reinforcing elements 3 in the two belt layers 2 are inclined at an angle of 24° with respect to an equator of the tire and crossed with each other. Furthermore, the belt layer 2 located side a tread portion has a width slightly narrower than that of the belt layer 2 located side a carcass ply.

Each of these test tires 1 is run on a drum testing machine at a speed of 80 km/hr under an internal pressure of 1.9 kgf/cm$^2$ and a load of 455 kg over a distance of 60.000 km and thereafter a length of cracking created in the vicinity of widthwise end of the belt layer 2 is measured to obtain results as shown in Table 1.

TABLE 1

Figure 2B:
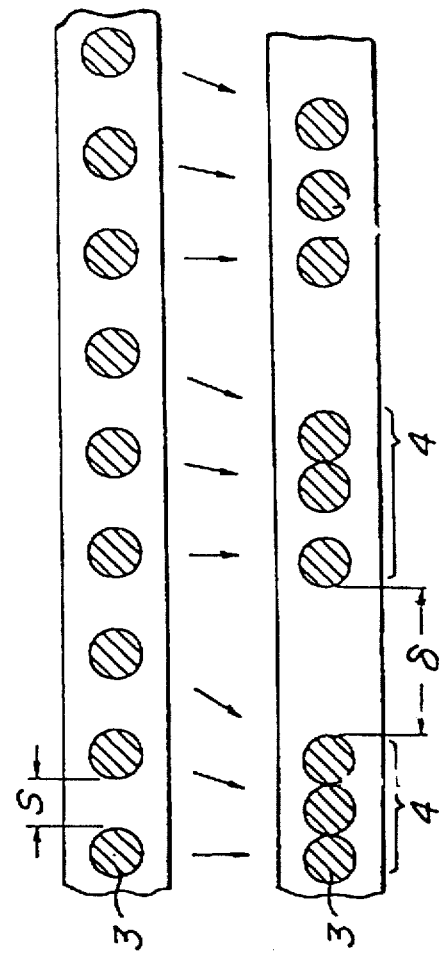
Figure 21B:
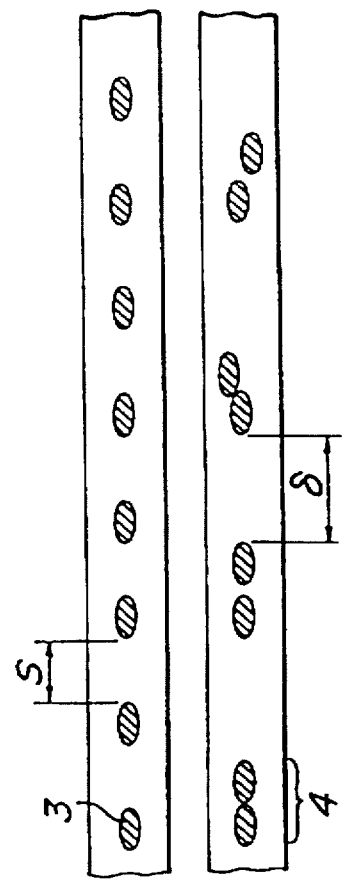

| Reinforcing element | End count (elements/50 mm) | Distance S between reinforcing elements arranged at equal spaces (mm) | Distance δ between reinforcing elements not grouped with each other (mm) | Ratio of cracking length | Remarks |
| --- | --- | --- | --- | --- | --- |
| Kevlar cord of 1500 d/2 | 43.5 | 0.54 | — | 0.60 | FIG. 2a |
|  |  | — | 1.62 |  | FIG. 2b |
| Kevlar cord of 1500 d/2 | 43.5 | 0.54 | — | 0.52 | FIG. 3a |
|  |  | — | 2.16 |  | FIG. 3b |
| HM PET cord of 1500 d/2 | 59.1 | 0.07 | — | 0.71 | FIG. 4a |
|  |  | — | 0.42 |  | FIG. 4b |
| Kevlar monofilament of 0.4 mm in diameter | 80.0 | 0.23 | — | 0.82 | FIG. 5a |
|  |  | — | 0.46 |  | FIG. 5b |
| Kevlar cord of 1500 d/2 | 43.5 | 0.54 | — | 0.94 | FIG. 6a |
|  |  | — | 0.65 |  | FIG. 6b |
| Kevlar cord of 1500 d/2 | 43.5 | 0.54 | — | 0.85 | FIG. 7a |
|  |  | — | 0.72 |  | FIG. 7b |
| steel cord of 1 × 5 × 0.23 | 41.0 | 0.59 | — | 0.83 | FIG. 5a |
|  |  | — | 1.18 |  | FIG. 5b |
| steel cord of 1 × 5 × 0.23 | 41.0 | 0.59 | — | 0.77 | FIG. 21a |
|  |  | — | 1.18 |  | FIG. 21b |

Since the cracking created in the vicinity of the widthwise end of the belt is observed only in the belt layer located side the tread portion, the measured results in Table 1 show the ratio of cracking length in only the belt layer located side the tread portion. Based on this fact, it is possible to apply the rubber-coated layer according to the invention only to the belt layer located side the tread portion.

7.00 kgf/cm$^2$ and a load of 2600 kg over a distance of 100,000 km, the cracking length created in the vicinity of the widthwise end of the belt is measured to obtain results as shown in Table 2.

TABLE 2

| Reinforcing element | End count (elements/ 50 mm) | Distance S between reinforcing elements arranged at equal spaces (mm) | Distance δ between reinforcing elements not grouped with each other (mm) | Ratio of cracking length | Remarks |
| --- | --- | --- | --- | --- | --- |
| Kevlar cord of 1500 d/2 | 70.0 | 0.09 | — | 0.71 | FIG. 9a |
|  |  | — | 0.27 |  | FIG. 9b |

When the arrangement of the reinforcing elements is compared between FIG. 5b and FIG. 21b using the steel cord as the reinforcing element, a better result is obtained in the arrangement of FIG. 21b in which the reinforcing elements in the group are shifted in the radial direction than that of FIG. 5b in which the reinforcing elements are arranged straight in parallel with each other. This is due to the fact that strain of rubber facing to the cut ends of the reinforcing elements by the piercing of the reinforcing elements is dispersed in the arrangement of FIG. 21b to delay the occurrence of fine cracking created in the rubber as compared with the arrangement of FIG. 5b.

EXAMPLE 2

Figure 8:
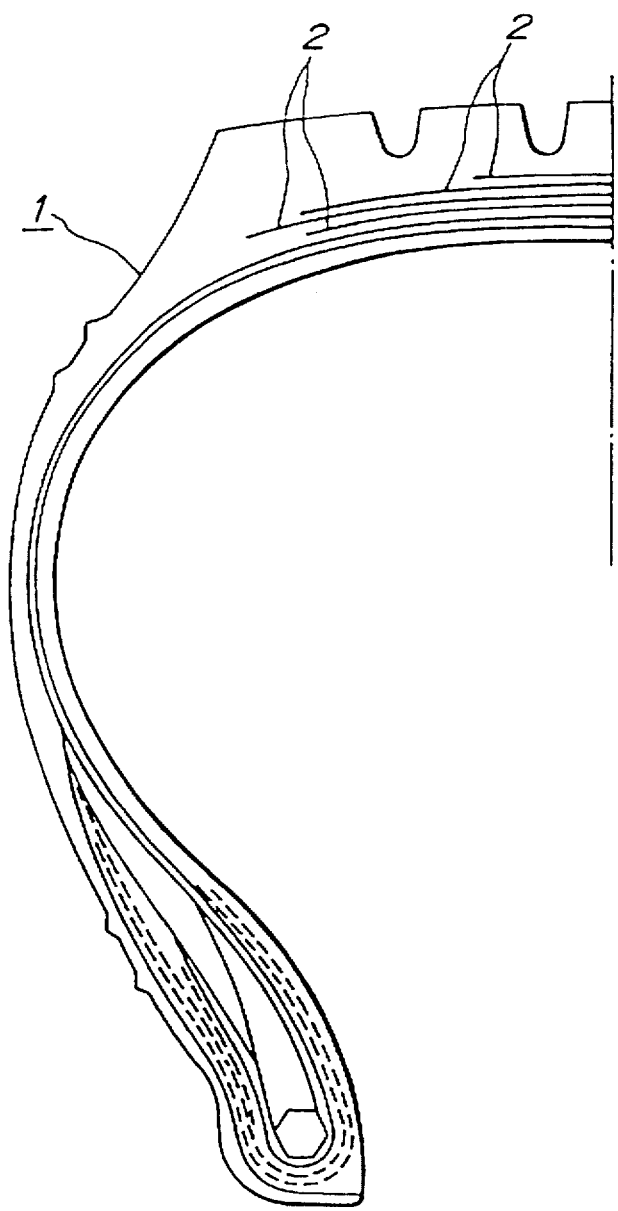
FIG. 8 is a diagrammatically section view of a first embodiment of the pneumatic tire for truck and bus to be tested.

As a radial tire 1 for truck and bus having a tire size of 10.00 R20 as shown in FIG. 8, there are provided two test tires, in which four belt layers 2 having the arrangement of the reinforcing elements as shown in FIG. 9a or 9b are arranged for reinforcing the tread portion and the reinforcing elements in these belt layers are inclined at angles of 18° upward to the left, 18° upward to the left, 18° upward to the right and 50° upward to the right with respect to the equator of the tire, respectively, viewing from the side of the tread portion.

After each of the test tires is run on a drum testing machine at a speed of 60 km/hr under an internal pressure of The cracking created in the vicinity of the widthwise end of the belt is observed only in the second belt layer viewed from the side of the tread portion. From this fact, it is apparent that the rubber-coated layer according to the invention can be applied only to the second belt layer viewed from the side of the tread portion.

EXAMPLE 3

As a radial tire 1 for truck and bus having a tire size of 11/70 R22.5 as shown in FIG. 10, there are eleven test tires in which a carcass ply 5 having the arrangement of the reinforcing elements as shown in FIGS. 11 to 15 is wound around a bead core 7 from an inside of the tire toward outside thereof to form a turnup portion 6. Numeral 8 is a bead portion reinforcing layer. Furthermore, the tire structure other than the carcass ply is substantially the same as in the conventional radial tire. Moreover, there are used various reinforcing elements 3 as shown in Tables 3 and 4.

Each of these test tires is run on a drum testing machine at a speed of 80 km/hr under an internal pressure of 8.0 kgf/cm$^2$ and a load of 3000 kg, during which a running distance till the occurrence of cracking in the carcass ply is measured to obtain results as shown in Tables 3 and 4.

TABLE 3

| Reinforcing element | End count (elements/ 50 mm) | Distance S between reinforcing elements arranged at equal spaces (mm) | Distance δ between reinforcing elements not grouped with each other (mm) | Ratio of running distance | Remarks |
| --- | --- | --- | --- | --- | --- |
| steel cord of 3 + 9 + 15 × 0.175 | 27.56 | 0.75 — | — 1.50 | 1.23 | FIG. 11a FIG. 11b |
| steel cord of 3 + 9 × 0.23 | 30.28 | 0.71 — | — 2.13 | 1.59 | FIG. 12a FIG. 12b |
| steel cord of 1 × 5 × 0.25 | 47.43 | 0.37 — | — 0.93 | 1.20 | FIG. 13a FIG. 13b |
| steel cord of 1 × 4 × 0.25 | 59.29 | 0.26 — | — 1.30 | 1.60 | FIG. 14a FIG. 14b |
| steel monofilament of 0.3 mm in diameter | 102.5 | 0.19 — | — 0.94 | 1.37 | FIG. 14a FIG. 14b |
| Kevlar monofilament of 0.4 mm in diameter | 99.5 | 0.10 — | — 0.51 | 1.10 | FIG. 14a FIG. 14b |
| Kevlar cord of 1500 d/2 | 54.0 | 0.30 — | — 1.48 | 1.66 | FIG. 14a FIG. 14b |

TABLE 4

| Reinforcing element | End count (elements/ 50 mm) | Distance S between reinforcing elements arranged at equal spaces (mm) | Distance δ between reinforcing elements not grouped with each other (mm) | Ratio of running distance | Remarks |
| --- | --- | --- | --- | --- | --- |
| steel cord of 3 + 9 × 0.23 | 35.30 | 0.48 — | — 0.64 | 1.16 | FIG. 15a FIG. 15b |
| steel cord of 3 + 9 × 0.23 | 35.30 | 0.48 — | — 0.60 | 1.08 | FIG. 15a FIG. 15c |
| steel monofilament of 0.3 mm in diameter | 96.0 | 0.22 — | — 0.29 | 1.11 | FIG. 15a FIG. 15b |
| Kevlar monofilament of 0.4 mm in diameter | 93.2 | 0.14 — | — 0.18 | 1.10 | FIG. 15a FIG. 15b |
| Kevlar cord of 1500 d/2 | 50.7 | 0.36 — | — 0.48 | 1.14 | FIG. 15a FIG. 15b |

EXAMPLE 4

As a radial tire 1 for passenger car having a tire size of P235/75 SR15 as shown in FIG. 16, there are provided four test tires in which a carcass ply 5 having the arrangement of the reinforcing elements as shown in FIGS. 17 to 18 is wound around a bead core 7 from an inside of the tire toward outside thereof to form a turnup portion 6. Furthermore, the tire structure other than the carcass ply is substantially the same as in the conventional radial tire. Moreover, there are used various reinforcing elements 3 as shown in Table 5.

Each of these test tires is run on a drum testing machine at a speed of 60 km/hr under an internal pressure of 2.0 kgf/cm² and a load of 1450 kg, during which a running distance till the occurrence of cracking in the carcass ply is measured to obtain results as shown in Table 5.

TABLE 5

| Reinforcing element | End count (elements/ 50 mm) | Distance S between reinforcing elements arranged at equal spaces (mm) | Distance δ between reinforcing elements not grouped with each other (mm) | Ratio of running distance | Remarks |
| --- | --- | --- | --- | --- | --- |
| nylon-6,6 monofilament | 39.08 | 0.78 — | — 1.56 | 1.29 | FIG. 17a FIG. 17b |

TABLE 5-continued

| Reinforcing element | End count (elements/ 50 mm) | Distance S between reinforcing elements arranged at equal spaces (mm) | Distance δ between reinforcing elements not grouped with each other (mm) | Ratio of running distance | Remarks |
|---|---|---|---|---|---|
| of 0.5 mm in diameter | | | | | |
| SR II PET cord of 1000 d/2 | 53.4 | 0.41 — | — 1.23 | 1.50 | FIG. 18a FIG. 18b |
| steel mono-filament of 0.23 mm in diameter | 49.8 | 0.77 — | — 1.54 | 1.68 | FIG. 17a FIG. 17b |
| Kevlar mono-filament of 0.4 mm in diameter | 36.3 | 0.98 — | — 1.96 | 1.56 | FIG. 17a FIG. 17b |
| Kevlar cord of 1500 d/2 | 33.7 | 0.85 — | — 1.70 | 1.65 | FIG. 17a FIG. 17b |

EXAMPLE 5

As a radial tire 1 for truck and bus having a tire size of 11/70 R22.5 as shown in FIG. 19 or 20, there are provided eight test tires in which a rubber-coated layer having the arrangement of the reinforcing elements as shown in FIGS. 21a to 24b is used as a bead portion reinforcing layer 8. In the tire of FIG. 20, numeral 9 is an additional reinforcing layer of steel cords reinforcing the carcass ply 5. Furthermore, the tire structure other than the bead portion reinforcing layer is substantially the same as in the conventional radial tire. Moreover, there are used various reinforcing elements 3 as shown in Table 6. As illustrated in FIG. 22b, a substantial spacing exists between at least some mutually adjacent reinforcing elements in one group compared to a space between mutually adjacent reinforcing elements in another group and the distance between mutually adjacent reinforcing elements within each of the groups is not the same in all of the groups.

Each of these test tires is run on a drum testing machine at a speed of 60 km/hr under an internal pressure of 7.5 kgf/cm$^2$ and a load of 3000 kg over a distance of 60,000 km, and thereafter the cracking length created in the vicinity of outward end of the bead portion reinforcing layer 8 in the radial direction of the tire is measured to obtain results as shown in Table 6.

TABLE 6

| Tire structure | Reinforcing element | End count (elements/ 50 mm) | Inclination angle (°) | Distance S between reinforcing elements arranged at equal spaces (mm) | Distance δ between reinforcing elements not grouped with each other (mm) | Ratio of cracking length | Remarks |
|---|---|---|---|---|---|---|---|
| FIG. 19 | nylon cord of 1260 d/2 | 35.0 | 38 | 1.33 — | — 2.83 | 0.78 | FIG. 21a FIG. 21b |
| FIG. 20 | nylon cord of 1260 d/2 | 34.5 | 30 | 1.68 — | — 3.56 | 0.79 | FIG. 21a FIG. 21b |
| FIG. 19 | nylon mono-filament of 4000 d | 50.2 | 38 | 0.97 — | — 4.06 | 0.59 | FIG. 22a FIG. 22b |
| FIG. 20 | nylon mono-filament of 4000 d | 48.0 | 30 | 1.28 — | — 5.34 | 0.63 | FIG. 22a FIG. 22b |
| FIG. 20 | steel mono-filament of 0.3 mm in diameter | 50.4 | 30 | 1.56 — | — 3.12 | 0.48 | FIG. 21a FIG. 21b |
| FIG. 20 | steel mono-filament of 0.3 mm in diameter | 50.4 | 30 | 1.56 — | — 3.12 | 0.53 | FIG. 5a FIG. 5b |
| FIG. 20 | steel cord of 1 × 5 × 0.23 | 34.5 | 30 | 1.68 — | — 3.36 | 0.46 | FIG. 21a FIG. 21b |
| FIG. 20 | steel cord of 1 × 5 × 0.23 | 34.5 | 30 | 1.68 — | — 3.36 | 0.52 | FIG. 5a FIG. 5b |

When the arrangement of the reinforcing elements is compared between FIG. 5b and FIG. 21b using the steel cord as the reinforcing element, a better result is obtained in the arrangement of FIG. 21b in which the reinforcing elements in the group are shifted in the radial direction than that of FIG. 5b in which the reinforcing elements are arranged straight in parallel with each other. This is due to the fact that strain of rubber facing to the cut ends of the reinforcing elements by the piercing of the reinforcing elements is dispersed in the arrangement of FIG. 21b to delay the occurrence of fine cracking created in the rubber as compared with the arrangement of FIG. 5b.

Figure 23B:
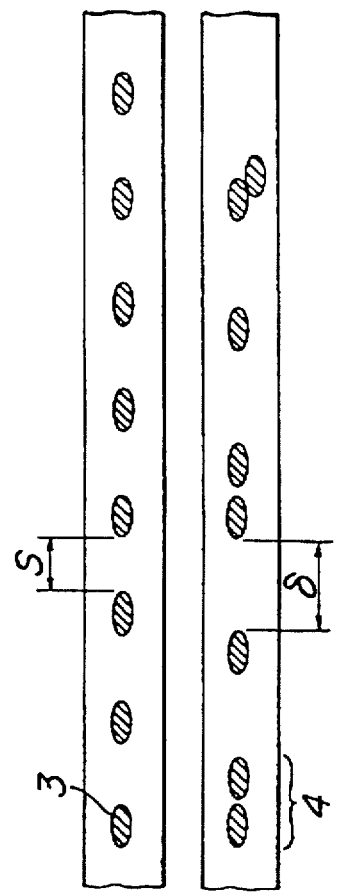

Moreover, similar results are obtained even in the arrangement of the reinforcing elements 3 as shown in FIGS. 23a and 24b.

EXAMPLE 6

As a radial tire 1 for passenger car having a tire size of 195/75 R14 as shown in FIG. 25, there are four test tires in which a rubber-coated layer having the arrangement of the reinforcing elements as shown in FIG. 26 is used as a bead portion reinforcing layer 8. Furthermore, the tire structure other than the bead portion reinforcing layer is substantially the same as in the conventional radial tire. Moreover, there are used various reinforcing elements 3 as shown in Table 7.

Each of these test tires is run on a drum testing machine at a speed of 80 km/hr under an internal pressure of 2.0 kgf/cm$^2$ and a load of 600 kg over a distance of 60,000 km, and thereafter the cracking length created in the vicinity of outward end of the bead portion reinforcing layer 8 in the radial direction of the tire is measured to obtain results as shown in Table 7.

TABLE 7

| Tire structure | Reinforcing element | End count (elements/ 50 mm) | Inclination angle (°) | Distance S between reinforcing elements arranged at equal spaces (mm) | Distance δ between reinforcing elements not grouped with each other (mm) | Ratio of cracking length | Remarks |
|---|---|---|---|---|---|---|---|
| FIG. 25 | Kevlar cord of 1500 d/2 | 35.0 | 60 | 0.92 | — | 0.67 | FIG. 26a |
|  |  |  |  | — | 2.83 |  | FIG. 26b |
| FIG. 25 | Kevlar monofilament of 0.4 mm in diameter | 64.4 | 60 | 0.43 | — | 0.73 | FIG. 26a |
|  |  |  |  | — | 1.33 |  | FIG. 26b |

Moreover, similar results are obtained even in the arrangement of the reinforcing elements 3 as shown in FIGS. 27a and 27b.

As mentioned above, the invention can effectively prevent the growth and propagation of cracking created in the vicinity of cut ends of the reinforcing elements in the tire component causing separation failure at the widthwise end of the tire component in the pneumatic radial tire.

What is claimed is:

1. A pneumatic radial tire comprising; a belt serving to reinforce a tread portion, a carcass ply wound around each of a pair of bead cores from an inside of a tire to an outside thereof, a bead portion reinforcing layer extending along each turnup portion of said carcass ply, said bead portion reinforcing layer being comprised of a rubber-coated layer containing a given number of reinforcing elements separately arranged in parallel with each other therein, wherein at least 50% of all reinforcing elements included in said rubber-coated layer are divided into plural groups each consisting of 2-9 reinforcing elements, a distance between mutually adjacent and opposite reinforcing elements, which are not grouped together, is wider than a distance between mutually adjacent reinforcing elements within each of said groups and, said distance between mutually adjacent reinforcing elements within each of said groups is not the same in all of said groups.

2. The pneumatic radial tire of claim 1 wherein each bead portion reinforcing layer is folded about one of said pair of bead cores from the inside of the tire toward the outside thereof.

3. The pneumatic radial tire according to claim 1, wherein the number of the reinforcing elements is the same in said groups.

4. The pneumatic radial tire according to claim 1, wherein the number of the reinforcing elements is different in said groups.

5. The pneumatic radial tire according to claim 1, wherein a distance between the adjacent reinforcing elements in said groups is narrower than the distance between all adjacent reinforcing elements if all reinforcing elements included in said rubber-coated layer were arranged at equal space.

6. The pneumatic radial tire according to claim 5, wherein some of the adjacent reinforcing elements in said groups contact with each other.

7. The pneumatic radial tire according to claim 5, wherein at least some of the reinforcing elements in said groups are shifted with each other in the radial directions.

8. The pneumatic radial tire according to claim 5, wherein at least some of the reinforcing elements in said groups are overlapped with each other in the radial directions.

9. The pneumatic radial tire of claim 1 wherein not all of said reinforcing elements in said rubber-coated layer are divided into said plural groups.

10. The pneumatic radial tire of claim 1 wherein said reinforcing elements are steel cords and each group consists of two steel cords.

11. The pneumatic radial tire of claim 1 wherein said reinforcing elements are steel cords and each group consists of three steel cords.

12. The pneumatic radial tire of claim 1 wherein said reinforcing elements are steel cords.

13. The pneumatic radial tire of claim 1 wherein said reinforcing elements are organic monofilaments.

14. The pneumatic radial tire of claim 1 wherein said reinforcing elements are steel monofilaments.

15. The pneumatic radial tire of claim 1 wherein said reinforcing elements are organic fiber cords.

16. A pneumatic radial tire comprising; a belt serving to reinforce a tread portion, a carcass ply wound around each of a pair of bead cores from an inside of a tire to an outside thereof, a bead portion reinforcing layer extending along each turnup portion of said carcass ply, said bead portion reinforcing layer being comprised of a rubber-coated layer containing a given number of reinforcing elements separately arranged in parallel with each other therein, wherein at least 50% of all reinforcing elements included in said rubber-coated layer are divided into plural groups each consisting of 2-9 reinforcing elements, a distance between mutually adjacent and opposite reinforcing elements, which are not grouped together, is wider than a distance between mutually adjacent reinforcing elements within each of said groups such that a substantial spacing exists between at least some reinforcing elements in one group compared to a space between reinforcing elements in another group.

17. The pneumatic radial tire of claim 16 wherein each bead portion reinforcing layer is folded about one of said pair of bead cores from the inside of the tire toward the outside thereof.

18. The pneumatic radial tire of claim 16 wherein not all of said reinforcing elements in said rubber-coated layer are divided into said plural groups.

19. The pneumatic radial tire of claim 16 wherein said reinforcing elements are steel cords and each group consists of two steel cords.

20. The pneumatic radial tire of claim 16 wherein said reinforcing elements are steel cords and each group consists of three steel cords.

21. The pneumatic radial tire of claim 16 wherein said reinforcing elements are steel cords.

22. The pneumatic radial tire of claim 16 wherein said reinforcing elements are organic monofilaments.

23. The pneumatic radial tire of claim 16 wherein said reinforcing elements are steel monofilaments.

24. The pneumatic radial tire of claim 16 wherein said reinforcing elements are organic fiber cords.

25. A pneumatic radial tire comprising; a belt serving to reinforce a tread portion, a carcass ply wound around each of a pair of bead cores from an inside of a tire to an outside thereof, a bead portion reinforcing layer extending along each turnup portion of said carcass ply, said bead portion reinforcing layer being comprised of a rubber-coated layer containing a given number of reinforcing elements separately arranged in parallel with each other therein, wherein 30% to less than 50% of all reinforcing elements included in said rubber-coated layer are divided into plural groups each consisting of 2–9 reinforcing elements, a distance between mutually adjacent and opposite reinforcing elements, which are not grouped together, is wider than a distance between mutually adjacent reinforcing elements within each of said groups and, said distance between mutually adjacent reinforcing elements within each of said groups is not the same in all of said groups.

26. The pneumatic radial tire of claim 25 wherein each bead portion reinforcing layer is folded about one of said pair of bead cores from the inside of the tire toward the outside thereof.

27. The pneumatic radial tire of claim 25 wherein not all of said reinforcing elements in said rubber-coated layer are divided into said plural groups.

28. The pneumatic radial tire of claim 25 wherein said reinforcing elements are steel cords and each group consists of two steel cords.

29. The pneumatic radial tire of claim 25 wherein said reinforcing elements are steel cords and each group consists of three steel cords.

30. The pneumatic radial tire of claim 25 wherein said reinforcing elements are steel cords.

31. The pneumatic radial tire of claim 25 wherein said reinforcing elements are organic monofilaments.

32. The pneumatic radial tire of claim 25 wherein said reinforcing elements are steel monofilaments.

33. The pneumatic radial tire of claim 25 wherein said reinforcing elements are organic fiber cords.

34. A pneumatic radial tire comprising; a belt serving to reinforce a tread portion, a carcass ply wound around each of a pair of bead cores from an inside of a tire to an outside thereof, a bead portion reinforcing layer extending along each turnup portion of said carcass ply, said bead portion reinforcing layer being comprised of a rubber-coated layer containing a given number of reinforcing elements separately arranged in parallel with each other therein, wherein 30% to less than 50% of all reinforcing elements included in said rubber-coated layer are divided into plural groups each consisting of 2–9 reinforcing elements, a distance between mutually adjacent and opposite reinforcing elements, which are not grouped together, is wider than a distance between mutually adjacent reinforcing elements within each of said groups such that a substantial spacing exists between at least some reinforcing elements in one group compared to a space between reinforcing elements in another group.

35. The pneumatic radial tire of claim 34 wherein each bead portion reinforcing layer is folded about one of said pair of bead cores from the inside of the tire toward the outside thereof.

36. The pneumatic radial tire of claim 34 wherein not all of said reinforcing elements in said rubber-coated layer are divided into said plural groups.

37. The pneumatic radial tire of claim 34 wherein said reinforcing elements are steel cords and each group consists of two steel cords.

38. The pneumatic radial tire of claim 34 wherein said reinforcing elements are steel cords and each group consists of three steel cords.

39. The pneumatic radial tire of claim 34 wherein said reinforcing elements are steel cords.

40. The pneumatic radial tire of claim 34 wherein said reinforcing elements are organic monofilaments.

41. The pneumatic radial tire of claim 34 wherein said reinforcing elements are steel monofilaments.

42. The pneumatic radial tire of claim 34 wherein said reinforcing elements are organic fiber cords.

* * * * *